United States Patent Office 3,395,857
Patented Aug. 6, 1968

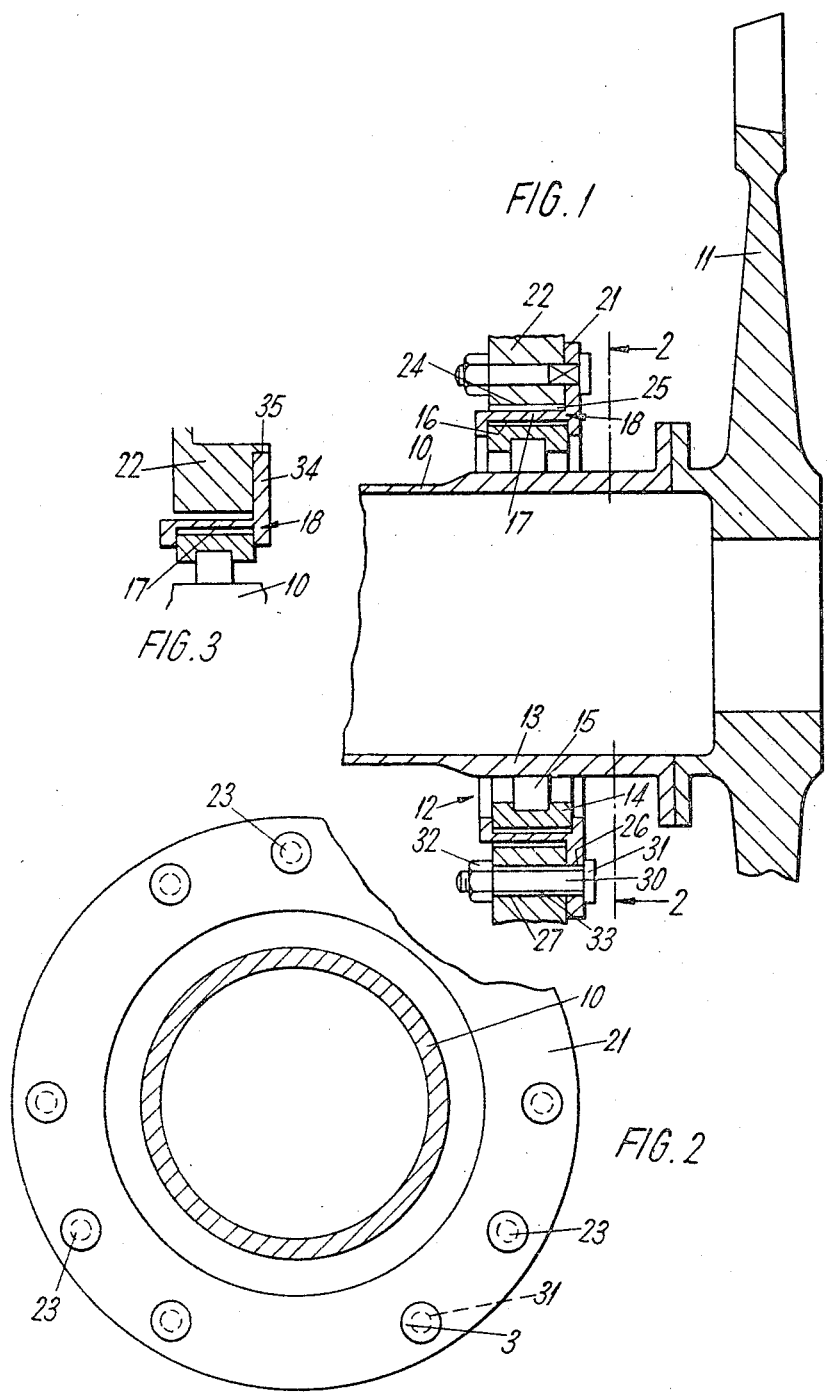

3,395,857
BEARING ASSEMBLY
James Alexander Petrie, Derby, and George Pask, Nottingham, England, assignors to Rolls-Royce Limited, Derby, England, a British company
Filed Jan. 25, 1967, Ser. No. 611,679
Claims priority, application Great Britain, Feb. 15, 1966, 6,693/66
7 Claims. (Cl. 230—116)

ABSTRACT OF THE DISCLOSURE

A housing, within which a bearing is mounted and from which it is spaced, is itself mounted in an opening in fixed structure. Bolts normally positively locate the housing within the opening, but they permit movement of the housing within the opening, when the housing is caused to move within the opening as a result of being subjected to a force exceeding a predetermined value.

---

This invention concerns a bearing assembly.

According to the present invention, there is provided a bearing assembly comprising a bearing mounted within and spaced by an annular space from a housing, means for urging the bearing towards a position in which it is disposed concentrically within the housing and for damping movement of the bearing away from said position, fixed structure having an opening within which the housing is mounted and from which it is spaced by an annular gap, and positioning means which normally positively locate the housing concentrically within the opening but which permit movement of the housing within the opening when the housing is caused to move within the opening as a result of being subjected to a force exceeding a predetermined value.

The positioning means preferably comprise frangible locating means which normally positively locate the housing concentrically within the opening but which rupture when the said force exceeds the said predetermined value, and securing means which secure the housing to the fixed structure in such a way that, on rupture of the locating means, the securing means permits the housing to move within the opening while damping movement of the housing therein.

The securing means may comprise a plurality of angularly spaced apart bolts which pass through apertures in said housing and fixed structure, a clearance being provided between each bolt and at least one of said apertures.

The frangible locating means may comprise a plurality of angularly spaced apart frangible bolts, dowels, spigots or the like which interconnect the housing and fixed structure.

The means for urging the bearing towards the said position preferably comprises means for maintaining a hydrodynamic squeeze film of oil in the said annular space.

The term "hydrodynamic squeeze film of oil" as used in this specification is intended to mean a film of oil which, when squeezed by relative vibrating movement between the bearing and the housing, modifies the said relative vibratory movement by the development of dynamic pressures within the film.

The invention also comprises a gas turbine engine provided with a bearing assembly as set forth above. Thus the engine may have a shaft which carries a turbine and a compressor of the engine and which is rotatably mounted within the said bearing.

The invention is illustrated, merely by way of example, in the accompanying drawings, in which:

FIGURE 1 is a broken-away sectional view through part of a gas turbine engine having a bearing assembly in accordance with the present invention, FIGURE 2 is a sectional view taken on the line 2—2 of FIGURE 1, and FIGURE 3 is a broken-away sectional view illustrating a modification.

Referring first to FIGURES 1 and 2 of the drawings, a gas turbine jet propulsion engine has a shaft 10 which carries a compressor (not shown) and a turbine 11. The shaft 10 is rotatably mounted within a bearing 12 having an inner race 13 which is formed integrally with the shaft 10. The bearing 12 has an outer race 14 and rollers 15 which are in rolling contact with the inner and outer races 13, 14.

The outer race 14 is mounted within and spaced by an annular space 16 from a cylindrical portion 17 of a housing 18. Means (not shown) are provided for maintaining a hydrodynamic squeeze film of oil in the annular space 16. The hydrodynamic squeeze film of oil thus both urges the bearing 12 towards the position in which it is disposed concentrically within the housing 18 and also damps movement of the bearing 12 away from said position.

The housing 18 has an end flange 21 at the downstream end of the cylindrical portion 17. The end flange 21 is secured to fixed structure 22 by three equi-angularly spaced apart bolts 23 (or by dowels, spigots or the like). The bolts 23 are frangible when subjected to a shear force which exceeds a predetermined value.

The fixed structure 22 has an opening 24 within which the cylindrical portion 17 of the housing 18 is mounted and from which it is spaced by an annular gap 25. The flange 21 has six equi-angularly spaced apart apertures 26 therein which are aligned with apertures 27 in the fixed structure 22. The fixed structure 22 and flange 21 in addition to being secured together by the frangible bolts 23, are also secured together by bolts 30 each of which has a head 31 and a nut 32. Each of the bolts 30 passes through the aligned apertures 26, 27 with a clearance 33 whose radial extent is substantially the same as the radial extent of the annular gap 25.

During normal operation of the engine, the hydrodynamic squeeze film of oil in the annular space 16 will smooth out normal unbalanced vibration because it permits the shaft 10 to "orbit" about its dynamic centre which may not coincide with its geometric centre. During such normal unbalanced vibration, moreover, the frangible bolts 23 will positively locate the cylindrical portion 17 of the housing 18 concentrically within the opening 24.

If, however, the shaft 10 should become badly unbalanced, e.g. as a result of a blade coming off either the compressor or the turbine 11, the frangible bolts 23 will rupture when the shear force to which they are subjected exceeds a certain predetermined value. When this occurs, the housing 18 will continue to be secured to the fixed structure 22 by the bolts 30 which will permit the housing 18 to move within the opening 24 while damping movement of the housing 18 therein. That is to say the unbalanced force to which the shaft 10 is subjected at this time can "shuffle" the flange 21 of the housing 18 over the fixed structure 22 by reason of the provision of the clearances 33 and the annular gap 25, the heads 31 and nuts 32 respectively engaging the flange 21 and fixed structure 22 so as to damp movement until such time as the engine can be slowed down or stopped. During this time, engine seals will have rubbed but this is not of major importance since the merits of the construction shown in the drawings is that the engine can be safely stopped without the engine casing breaking and thus endangering the safety of the aircraft.

In FIGURE 3 there is shown a modification which is generally similar to that of FIGURES 1 and 2 and which for this reason will not be described in detail. In the FIGURE 3 construction, however, the housing 18 is provided with angularly spaced apart spigots 34 (only one shown) which are located in recesses 35 in the fixed structure 22. The spigots 34 are arranged to rupture when subjected to a shear load exceeding a predetermined value. In the FIGURE 3 construction, accordingly, if the shaft 10 is subjected to an unduly large unbalanced load, the spigots 34 will rupture and so permit the housing 18 to move within the fixed structure 22. Clearance bolts (not shown) similar to the bolts 30 of FIGURE 1 are provided and damping will occur by virtue of friction on the face of the fixed structure 22.

We claim:

1. A bearing assembly comprising a housing, a bearing mounted within and spaced by an annular space from the housing, means for urging the bearing towards a position in which it is disposed concentrically within the housing and for damping movement of the bearing away from said position, fixed structure defining an opening within which the housing is mounted and from which it is spaced by an annular gap, and positioning means which normally positively locate the housing concentrically within the said opening but which permit movement of the housing within the opening when the housing is caused to move within the opening as a result of being subjected to a force exceeding a predetermined value.

2. A bearing assembly as claimed in claim 1 in which the positioning means comprise frangible locating means which normally positively locate the housing concentrically within the said opening but which rupture when the said force exceeds the said predetermined value, and securing means which secure the housing to the fixed structure, said securing means, on rupture of the locating means, permitting the housing to move within the opening while damping movement of the housing therein.

3. A bearing assembly as claimed in claim 2 in which the securing means comprise a plurality of angularly spaced apart bolts which pass through apertures in said housing and fixed structure, a clearance being provided between each bolt and at least one of said apertures.

4. A bearing assembly as claimed in claim 2 in which the frangible locating means comprise a plurality of angularly spaced apart frangible securing members which interconnect the housing and fixed structure.

5. A bearing assembly as claimed in claim 1 in which means for urging the bearing towards the said position comprise means for maintaining a hydrodynamic squeeze film of oil in the said annular space.

6. A gas turbine engine provided with a bearing assembly as claimed in claim 1.

7. A gas turbine engine as claimed in claim 6 in which a shaft, which carries a turbine and a compressor of the engine, is rotatably mounted within said bearing.

References Cited

FOREIGN PATENTS 855,477  11/1960  Great Britain.

MARTIN P. SCHWADRON, *Primary Examiner.*

F. SUSKO, *Assistant Examiner.*